US012661666B2

(12) United States Patent
Doolittle

(10) Patent No.: US 12,661,666 B2
(45) Date of Patent: Jun. 23, 2026

(54) MISTING NOZZLE ASSEMBLY WITH INTERCHANGEABLE NOZZLES

(71) Applicant: The Fountainhead Group, Inc., New York Mills, NY (US)

(72) Inventor: James Doolittle, New York Mills, NY (US)

(73) Assignee: The Fountainhead Group, Inc., New York Muills, NY (US)

(*) Notice: Subject to any disclaimer, the term of this patent is extended or adjusted under 35 U.S.C. 154(b) by 0 days.

(21) Appl. No.: 18/668,470

(22) Filed: May 20, 2024

(65) Prior Publication Data

US 2024/0382980 A1 Nov. 21, 2024

Related U.S. Application Data

(60) Provisional application No. 63/467,632, filed on May 19, 2023.

(51) Int. Cl.
*B05B 1/14* (2006.01)
*B05B 1/10* (2006.01)
*B05B 12/00* (2018.01)

(52) U.S. Cl.
CPC .................. *B05B 1/14* (2013.01); *B05B 1/10* (2013.01); *B05B 12/0026* (2018.08)

(58) Field of Classification Search
CPC .................................... B05B 7/08; B05B 7/04
See application file for complete search history.

(56) References Cited

U.S. PATENT DOCUMENTS 6,182,905 B1 * 2/2001 Dupre ................... B05B 7/0433 239/14.2
10,279,360 B2 * 5/2019 Patel ......................... B05B 7/04
2011/0079664 A1 * 4/2011 Stednitz .................... B05B 1/14 239/428.5
2012/0241535 A1 * 9/2012 Carriere ................. A62C 31/05 239/425.5
2019/0060940 A1 * 2/2019 Smoot ....................... B05B 1/16

* cited by examiner

*Primary Examiner* — Phutthiwat Wongwian
*Assistant Examiner* — Jacek Lisowski
(74) *Attorney, Agent, or Firm* — BOND, SCHOENECK & KING, PLLC; George R. McGuire

(57) ABSTRACT

A misting nozzle assembly that includes a manifold having a fluid entry point and a plurality of ports formed therein each of which is fluidly connected to the fluid entry point. A plurality of nozzle is each adapted for attachment within a respective of the plurality of ports.

4 Claims, 6 Drawing Sheets

Misting distribution 48" high at 80 psi

MISTING NOZZLE ASSEMBLY WITH INTERCHANGEABLE NOZZLES

CROSS-REFERENCE TO RELATED APPLICATION

The present application relates and claims priority to U.S. Provisional Patent Application Ser. No. 63/467,632, filed May 19, 2023, the entirety of which is hereby incorporated by reference.

FIELD OF THE INVENTION

The present disclosure is directed generally to misting nozzles.

BACKGROUND

Misting nozzles are devices that are designed to create a fine mist by atomizing water or other liquids. They are commonly used for various applications such as cooling, humidification, dust suppression, odor control, and chemical spraying. Misting nozzles typically consist of a small orifice or nozzle that is designed to break up the liquid into tiny droplets, ranging in size from 20 to 200 microns. These droplets are then dispersed into the surrounding air, creating a fine mist.

Misting nozzles can be high pressure or low pressure. High-pressure misting nozzles operate at pressures of around 1000 PSI, which allows them to produce very fine droplets that quickly evaporate, creating a cooling effect. Low-pressure misting nozzles operate at pressures of 50 to 100 PSI and are commonly used for humidification and dust suppression applications. Both types of misting nozzles can be designed to produce different spray patterns, including cone, fan, and straight stream, depending on the application requirements. Additionally, misting nozzles can be made from a variety of materials, such as brass, stainless steel, or plastic, to suit the specific application requirements and environment.

When using a misting sprayer to apply herbicide or pesticides, there is often a large area to cover. Using a typical single nozzle sprayer provides suitable coverage but is time consuming.

Accordingly, there is a need in the art for a nozzle assembly that utilizes multiple nozzles spraying in different orientations to provide maximum coverage.

SUMMARY

The present disclosure is directed to a misting nozzle assembly.

According to an aspect is a misting nozzle assembly, comprising a manifold having a fluid entry point and a plurality of ports formed therein each of which is fluidly connected to the fluid entry point; and a plurality of nozzle, each nozzle being adapted for attachment within a respective of the plurality of ports.

According to an embodiment, each nozzle is positioned equidistant from the other nozzles.

According to an embodiment, each nozzle is positioned 120 degrees from the adjacent nozzles.

According to an embodiment, the misting nozzle assembly further comprises a plurality of threaded adapters, wherein each threaded adapter is positioned within a respective one of the ports.

According to an embodiment, the misting nozzle assembly further comprises a plurality of threaded caps, wherein each cap is adapted for positioning around a respective nozzle and to be securely connected to a respective threaded adapter, whereby each threaded cap secures a respective nozzle.

According to an embodiment, the misting nozzle assembly further comprises a plurality of gaskets.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure describes a nozzle, and more particularly, a multi-port nozzle used for misting applications.

Figure 1:
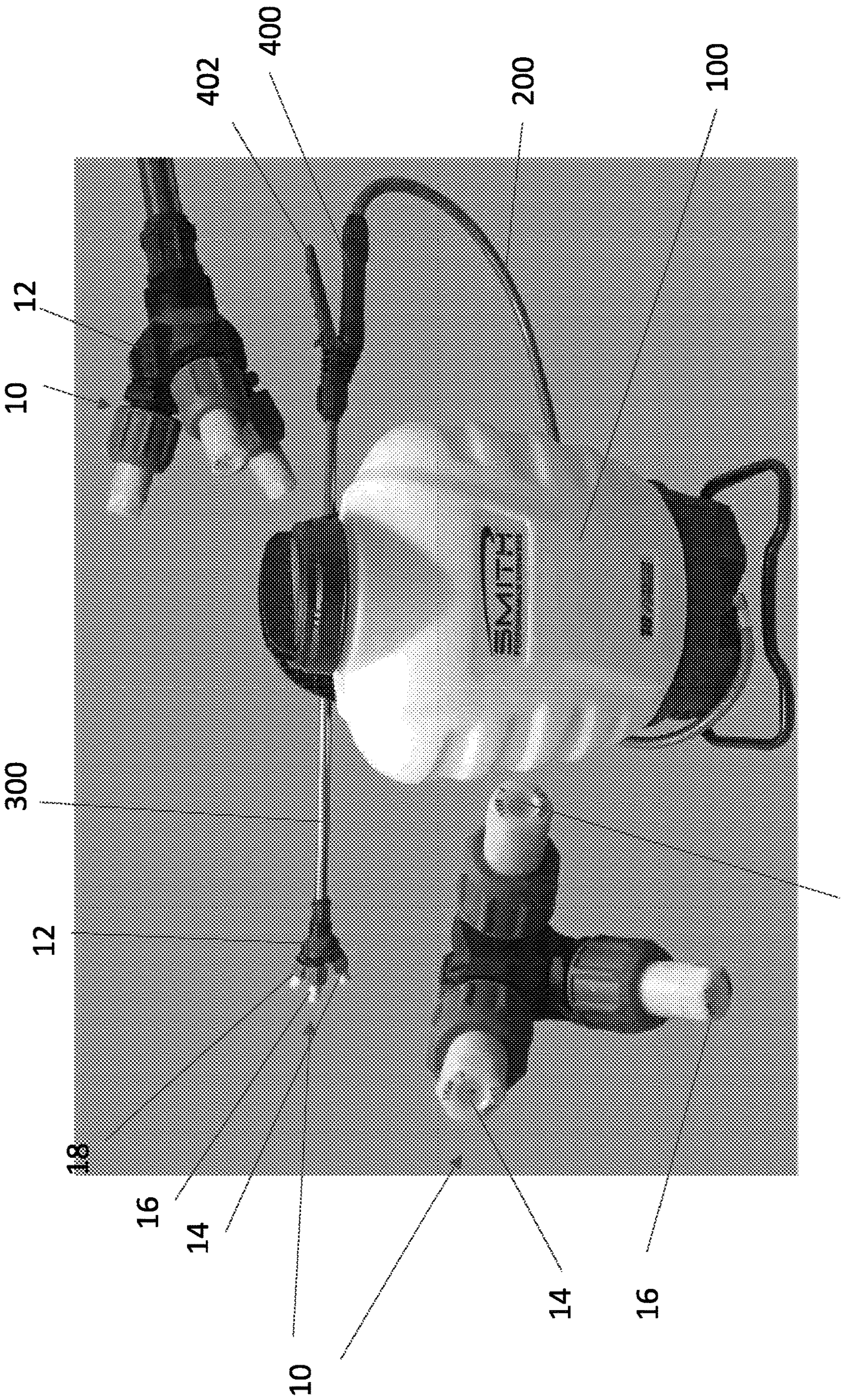
FIG. 1 is a perspective view of a misting nozzle assembly connected to a spray tank, in accordance with an embodiment.
Figure 2:
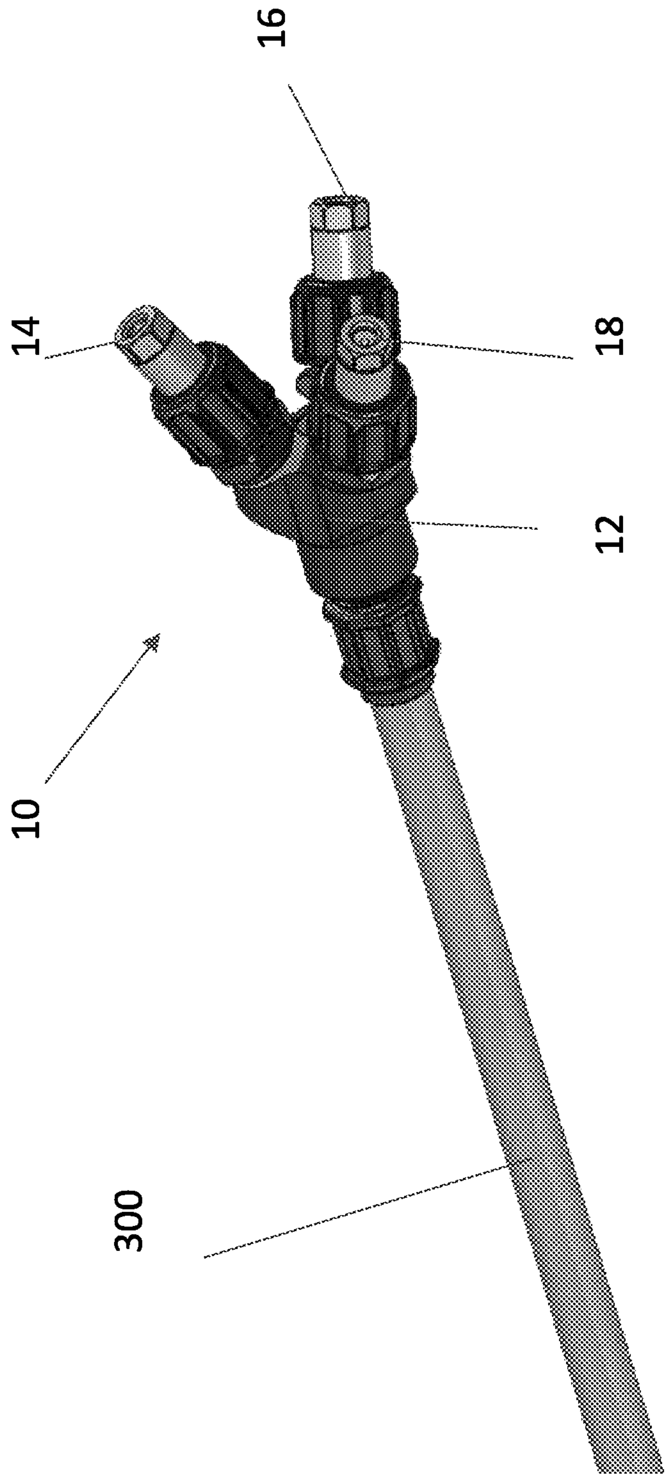
FIG. 2 is a perspective view of a misting nozzle assembly and partial spray wand, in accordance with an embodiment.
Figure 3:
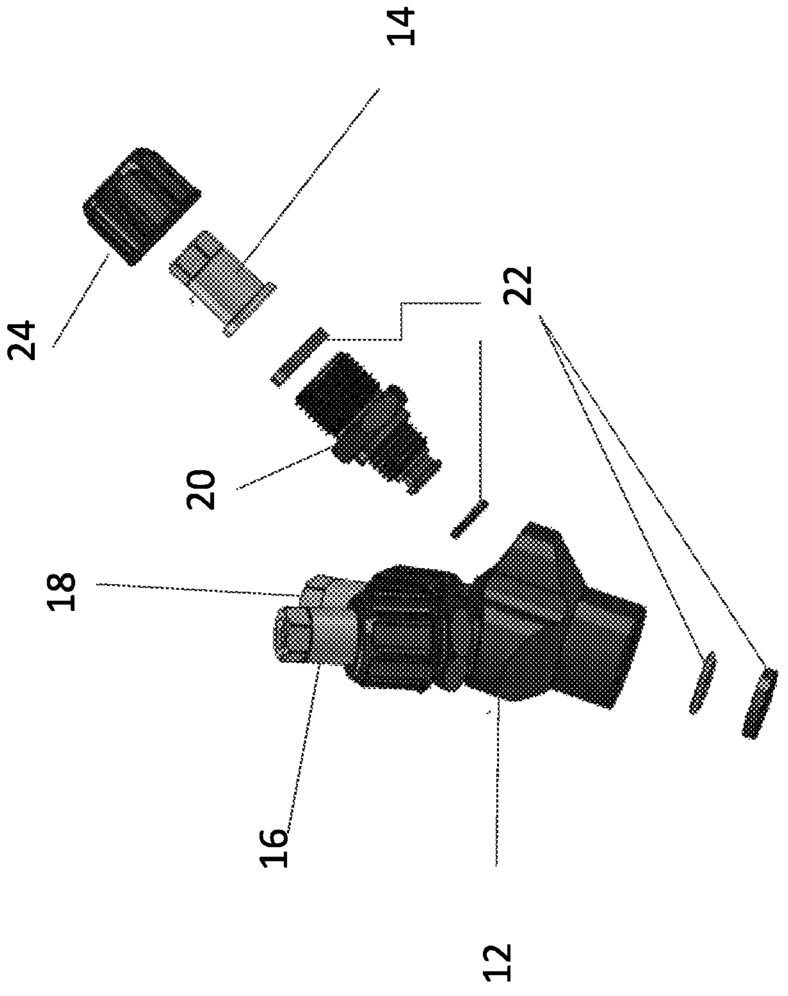
FIG. 3 is an exploded perspective view of a misting nozzle assembly, in accordance with an embodiment.
Figure 5:
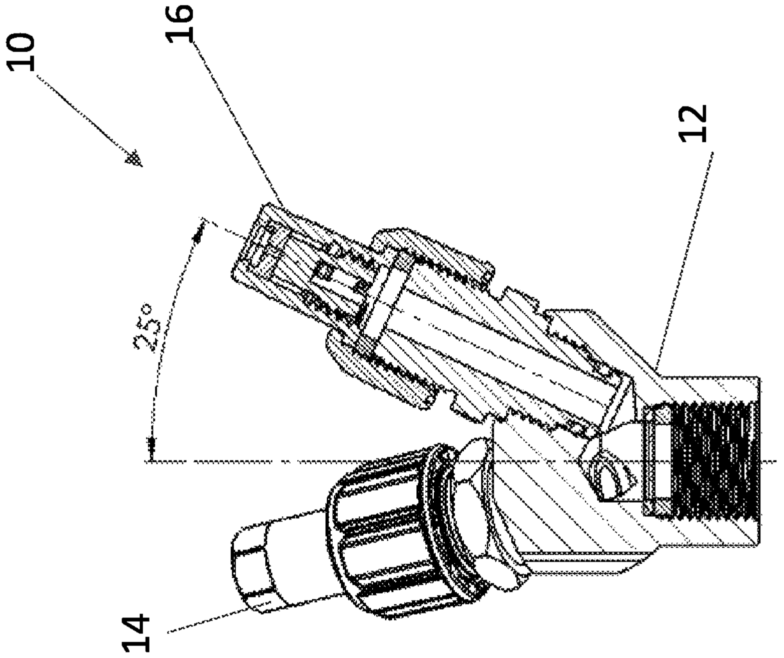
FIG. 5 is a cross-sectional view taken along section line B-B of FIG. 4, in accordance with an embodiment.
Figure 4:
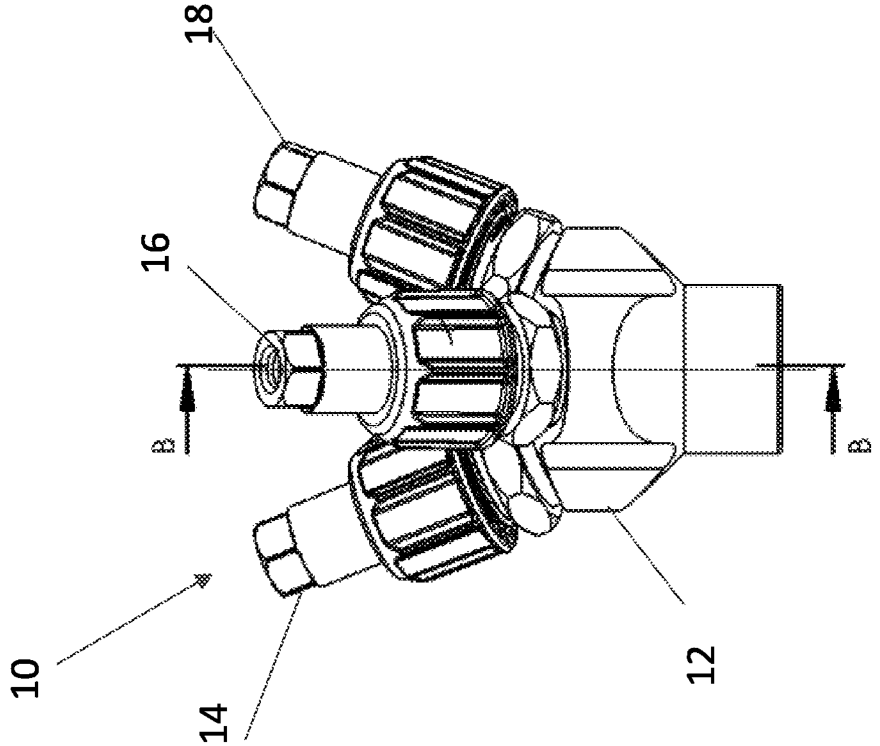
FIG. 4 is a front elevation view of a misting nozzle assembly, in accordance with an embodiment.
Figure 8:
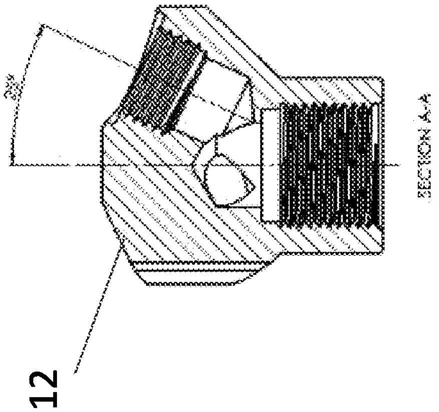
FIG. 8 is a cross-sectional view taken along section line A-A of FIG. 7, in accordance with an embodiment.
Figure 7:
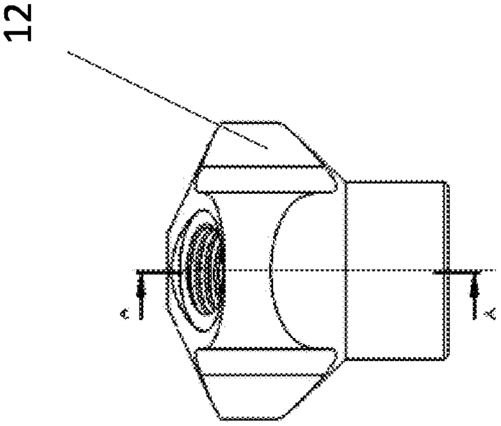
FIG. 7 is a front elevation view of a misting nozzle assembly, in accordance with an embodiment.
Figure 6:
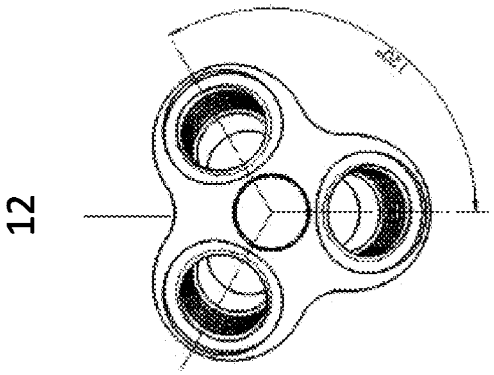
FIG. 6 is a top plan view of a misting nozzle assembly, in accordance with an embodiment.

Referring to FIG. 1, in one embodiment, is a nozzle assembly, designated generally by reference numeral 10, adapted for interconnection to a spray tank 100 via a hose 200 and wand 300 that collectively transport fluid between tank 200 and nozzle 10. Tank 100 is adapted to contain fluid therein and may contain a pump, either automatic or manual, that assists in moving the liquid from the tank 100, through the hose 200 and wand 300 for discharge through nozzle assembly 10. A handle 400 with user actuated trigger 402 can fluidly interconnect hose 200 and wand 300 to permit manual release of the liquid.

Referring to FIGS. 2-8, nozzle assembly 10 comprises a manifold 12 that fluidly connects to wand 300, and three nozzles 14, 16, and 18 extending from manifold 12 at roughly 120-degree angle from one another and at an outwardly directed angle. The assembly 10 further includes thread adapters 20 (one for each nozzle 14, 16 and 18), gaskets/O-rings 22 that are positioned at the fluid junction points of the various parts (i.e., where the manifold and wand connect, at the top and bottom ends of each nozzle, etc.), and a threaded cap 24 that fits over and securely retains the nozzles 14, 16 and 18 to manifold 12.

Manifold 12 comprises a main body that defines a fluid inlet pot that fluidly connects to three ports 26, 28, and 30 into which nozzles 14, 16 and 18 are seated, respectively. The ports 26, 28 and 30 are spaced equidistantly around the main body at 120-degree intervals and each includes internal threads that are adapted to receive the thread adapter 20 therein (see FIG. 6). Each port also extends at an outwardly directed angle of about 25 degrees from the center of the main body (see FIG. 8). This spatial arrangement creates a spray pattern that achieves a desirable range.

Each nozzle 14, 16 and 18 can include a desired spray pattern. Due to the interchangeability of the nozzles in the manifold 12, additional nozzles with differing spray patterns can be easily substituted for any of the nozzles that are attached to the manifold. Simply unscrewing cap 24 allows the user to remove a nozzle and insert a new one, followed by reattachment of the cap 24.

Figure 9A:
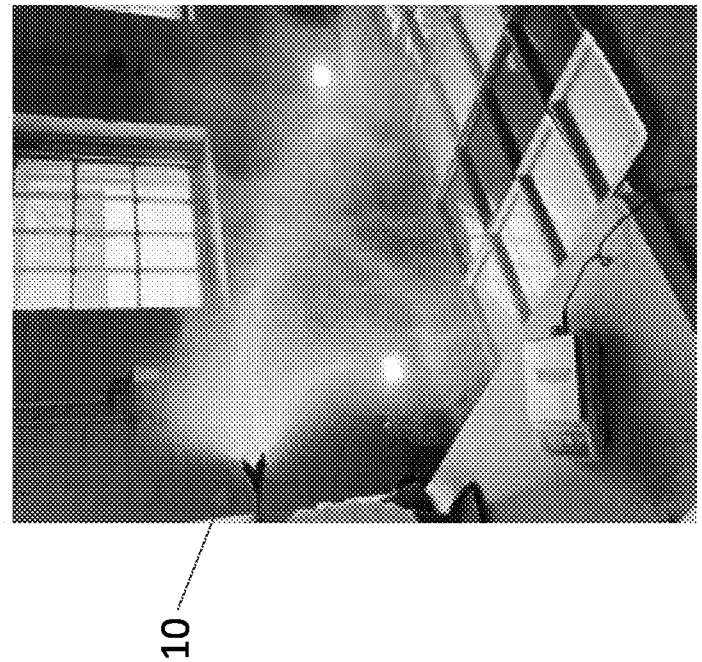
FIG. 9A is a perspective view of an experimental set-up, in accordance with an embodiment.
Figure 9B:
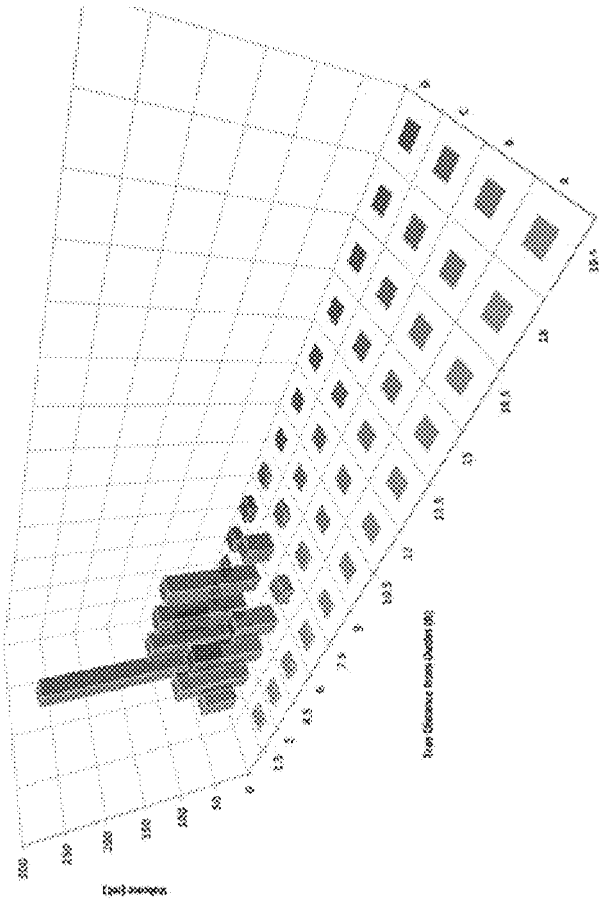
FIG. 9B is the graphical representation of the results of an experiment run on the experimental set-up of FIG. 9A, in accordance with an embodiment.

Referring to FIGS. 9A and 9B, an experimental set-up and results are shown. In the experiment, a nozzle assembly (attached to a fluid containing tank) was mounted on a four-foot high table (approximating the height a user would carry the nozzle assembly) and sprayed at 80 PSI towards a four columns of trays (each column containing about 12 trays), with each tray being adapted to collect the liquid received therein. The tray distances from the outlet and the volume of fluid collected in ml were collected and FIG. 9B shows the results graphically. As can be seen, the trays 1.5-7.5 feet from the source and located in the middle columns collected the most liquid.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A misting nozzle assembly, comprising:

a. a manifold having a fluid entry point and a plurality of ports formed therein each of which is fluidly connected to the fluid entry point;

b. a plurality of threaded adapters, each threaded adapter positioned within a respective one of the plurality of ports, wherein each of the plurality of ports includes internal threads that are adapted to receive the threaded adapter therein;

c. a plurality of nozzles, each nozzle being adapted for attachment within a respective one of the plurality of ports; and d. a plurality of threaded caps, wherein each cap is adapted for positioning around a respective nozzle and to be securely connected to a respective threaded adapter, whereby each threaded cap secures a respective nozzle.

2. The misting nozzle assembly according to claim 1, wherein each said nozzle is positioned equidistant from the other nozzles.

3. The misting nozzle assembly according to claim 2, wherein each said nozzle is positioned 120 degrees from the adjacent nozzles.

4. The misting nozzle assembly according to claim 1, further comprising a plurality of gaskets.

* * * * *